United States Patent [19]
Minten

[11] Patent Number: 5,251,471
[45] Date of Patent: Oct. 12, 1993

[54] DEVICE TO TEST THE BELLOWS OF A STERN DRIVE MOTOR FOR LEAKAGE

[76] Inventor: Joseph C. Minten, R.R. #1, Lakefield Ontario, Canada, K0L 2H0

[21] Appl. No.: 865,867

[22] Filed: Apr. 9, 1992

[51] Int. Cl.$^5$ .............................................. G01M 3/04
[52] U.S. Cl. ........................................ 73/40; 73/49.8
[58] Field of Search ................. 73/37, 40, 49.7, 46, 73/49.8

[56] References Cited

U.S. PATENT DOCUMENTS

| 2,691,773 | 10/1954 | Lichtenberger | 73/46 |
| 3,583,239 | 6/1971 | Paine | 73/49.8 |

FOREIGN PATENT DOCUMENTS

| 56937 | 1/1983 | Japan | 73/46 |
| 201131 | 8/1989 | Japan | 73/40 |
| 1245907 | 7/1986 | U.S.S.R. | 73/46 |

Primary Examiner—Hezron E. Williams
Assistant Examiner—Nashmiya Ashraf

[57] ABSTRACT

Disclosed herein is a test device for a stern drive motor of the type having a transom assembly including a bellows located between a inner transom portion and an outer transom portion, the device comprising: an inner sealing plug to seal against the inner transom portion; an outer sealing plug to seal against the outer transom portion, the inner and outer sealing plugs establishing a substantially air tight chamber within the inner and outer housing portions and the bellows. The device being further arranged to pressurize the bellows in order to detect leakage thereof.

5 Claims, 3 Drawing Sheets

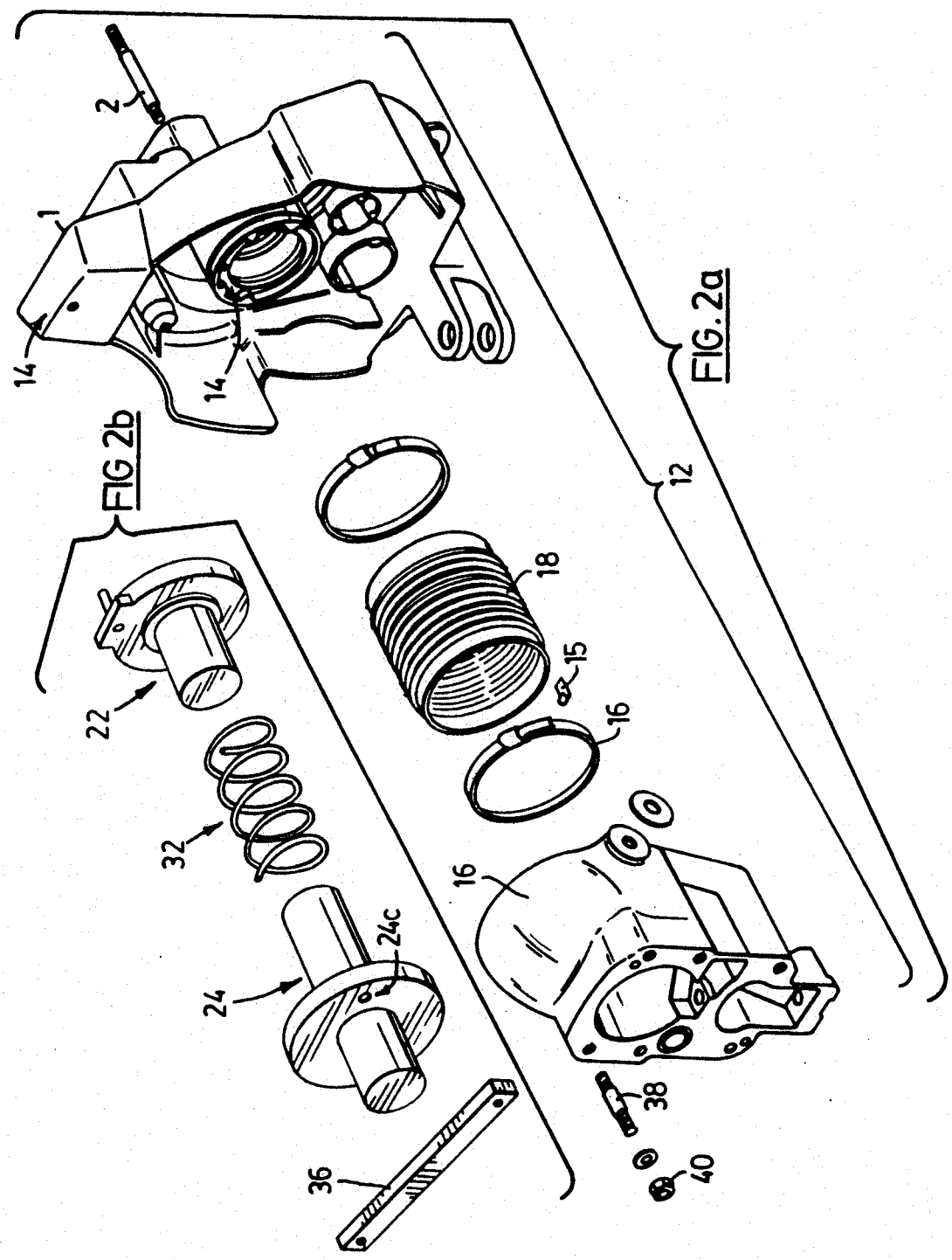

DEVICE TO TEST THE BELLOWS OF A STERN DRIVE MOTOR FOR LEAKAGE

BACKGROUND OF THE INVENTION

1. Field of the Invention

The present invention relates to boat motors, and in particular to 'stern drive' motors.

2. Description of the Related Art

The stern drive motor is known to have a stern drive unit which extends outwardly from the transom of the boat. The stern drive is anchored to the transom and has an articulated joint permitting the stern drive to steer the boat and trim or 'trail' the stern drive (that is remove the stern drive from the water). The articulating movement requires a number of joints which are housed within a bellows.

It is important that the bellows be water tight for a number of reasons, namely to prevent water entry into the hull and to protect the joints from damage. Proper maintenance of the motor requires regular removal of the stern drive from the transom assembly.

However, there is no tool currently available to test the bellows for leakage. Instead, it is accepted practise to replace the stern drive, lower the boat into the water and look through at the inside rear of the boat for water leakage. Therefore, if any water leakage is found, the boat must be removed from the water and the stern drive removed from the transom assembly to repair the bellows. This process becomes especially difficult and expensive when repairing the stern drive on the back of a house boat or other large water craft.

It is therefore an object of the present invention to provide a tool for checking the bellows for water leakage.

SUMMARY OF THE INVENTION

Briefly stated, the invention involves a test device for a stern drive motor of the type having a transom assembly including a bellows located between a inner transom portion and an outer transom portion, the device comprising: an inner sealing plug to seal against the inner transom portion; an outer sealing plug to seal against the outer transom portion, the inner and outer sealing plugs constituting means to establish a substantially air tight chamber within the inner and outer housing portions and the bellows, the device being further arranged to pressurize the bellows in order to detect leakage thereof.

BRIEF DESCRIPTION OF THE DRAWINGS

Several preferred embodiments of the present invention will now be described, by way of example only, with reference to the appended drawings in which:

FIG. 2a is an assembly view of a portion of the stern drive illustrated in FIG. 1;

FIG. 2b is an assembly view of a test device for a stern drive motor;

DESCRIPTION OF THE PREFERRED EMBODIMENTS

Figure 1:
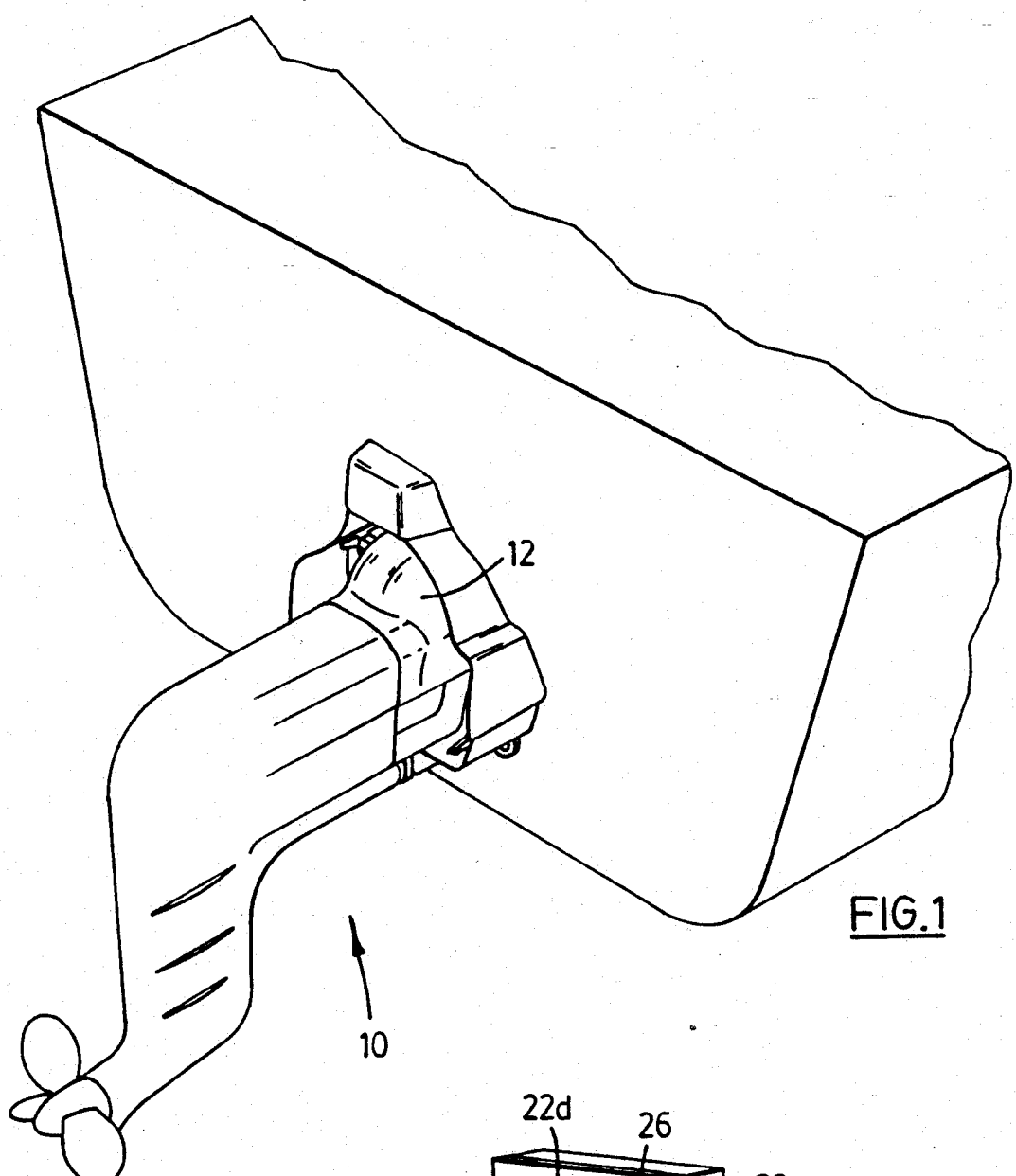
FIG. 1 is a perspective sketch of a stern drive.
Figure 4:
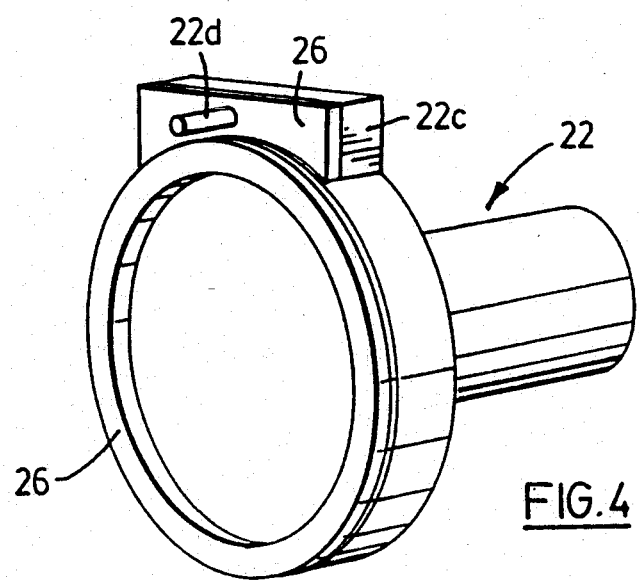
FIG. 4 is a perspective view of a portion of the test device illustrated in FIG. 2.

Referring to the figures, there is provided a stern drive 10 extending from the transom of a boat.

The stern drive is mounted to the transom by way of a transom assembly 12, the details of which are illustrated in FIG. 2. The transom assembly includes an inner transom portion in the form of a gimble housing 14 and an outer transom portion in the form of a bell housing 16. Located between the gimble and bell housings 14 and 16 is a flexible bellows 18.

Figure 3:
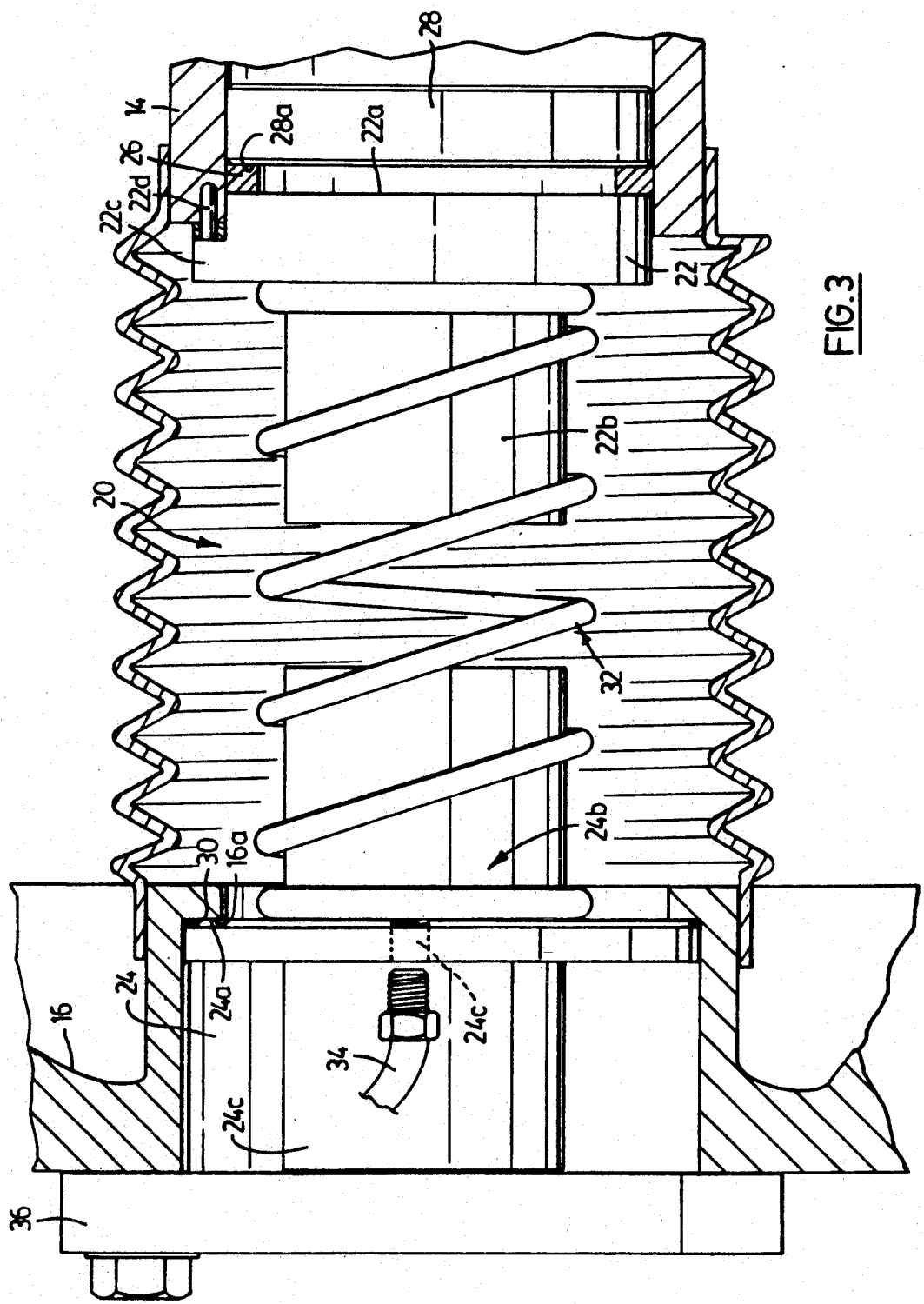
FIG. 3 is a fragmentary sectional view of the test device installed in the portion illustrated in FIG. 2.

Referring to FIG. 3, there is provided a bellows test device 20 having a number of components which seal against surfaces in the gimble and bell housings so that the bellows can be inflated. The test device includes an inner sealing plug 22 and an outer sealing plug 24. The inner sealing plug has an inner sealing surface 22a against which is attached a sealing gasket shown at 26. The sealing gasket seals the inner surface 22a against a mating surface 28a on a bearing assembly shown at 28 and located within the gimble housing 14. In addition, the inner sealing plug has a gasket upper projection 22c. An alignment pin 22d extends outwardly from the projection 22c in the direction of the gimble housing in order to fit within and seal against a venting hole shown at 14a.

The outer sealing plug 24 has an inner sealing surface 24a against which is attached an O-ring shown at 30. The O-ring 30 seals the inner surface 24a against a mating surface 16a on the bell housing 16.

A spring 32 is provided between the inner and outer sealing plugs 22 and 24 respectively. Guiding the spring in position are a pair of cylindrical spring guides extending inwardly from the inner and outer sealing plugs 22 and 24 as shown at 22b, 24b respectively.

The outer sealing plug is further provided with a threaded hole 25 which receives an air line shown at 34.

The bell housing 16 has an outer surface on which is located a number of studs 38 to secure the stern drive to the transom assembly 12. These studs 38 may be used to secure the test device 12 in place by way of a pressure bar shown at 36. The outer sealing plug 24 is further provided with an outer projection 24c which is dimensioned to provide a tight seal between the outer plug and the bell housing as will be described below.

In use, the inner sealing plug is inserted through the bell housing 16 and the bellows 18 and thereafter positioned with the gasket 26 against the surface 28a and the alignment pin 22d positioned in the venting hole.

The spring is then positioned on the spring guide 24b of the outer sealing plug and is guided through the bell housing and the bellows and thereafter onto the spring guide 22b on the inner plug 22. The pressure bar 36 is then positioned on two of the studs 38 and bolts 40 are tightened until the pressure bar is seated against the outer face of the bell housing 16. It should be noted that the outer projection 24c is dimensioned so that when the pressure bar is fully seated against the outside face of the bell housing, the O-ring 30 is firmly seated against surface 16a. In addition, the spring rate should be selected so that the inner plug is pressed firmly against its appropriate surface in the gimble housing to establish a seal therebetween. At this point, the test device is ready for operation.

The air hose 34 is then threaded into hole 24c and the bellows is thereafter pressurized. The level of pressure used should be carefully monitored so as not to exceed the limits of the bellows. For example, testing carried out on the bellows on some stern drives manufactured by Mercury Marine (a trademark) indicates that these bellows should not be inflated beyond 4 psi. Otherwise, the bellows may become dislodged from its reinforcing wire (that being the wire installed in the bellows to prevent collapse of the bellows and thus contact with the moving parts of the stern drive.)

It is suggested that the air hose 34 be attached to a hand pump since the hand pump maximizes the control of air pressure delivered to the bellows. However, the air hose 34 may be attached to a compressor provided great care is given to the level of air pressure delivered to the bellows.

There are of course other techniques that may be employed to secure the inner and outer sealing plug in place. For example, the spring may be replaced with hydraulic for pneumatic cylinders or for that matter a threaded rod. However, the spring has been found to be the more practical of these alternatives. In addition, one may pressurize the bellows with gases other than air, or for that matter with liquids such as water or oil. Again, air appears to be the more practical alternative.

It will of course be understood that the inner and outer sealing plugs must be provided with surfaces that compliment the appropriate mating sealing surfaces on the gimble and bell housings. For example, in some transom assemblies, retaining rings are used to retain the bearing. It follows that if the bearing surface is to be used in this instance, the gasket must have sufficient resiliency to accommodate the retaining ring and still seal the inner sealing plug against the gimble housing.

The gasket materials used must be sufficiently rugged to withstand the materials that can typically be found in the stern drive motor, including oil and grease.

I claim:

1. A leakage test device for a stern drive motor of the type having a transom assembly including a bellows located between an inner transom portion and an outer transom portion, said device comprising: an inner sealing plug to seal against said inner transom portion; an outer sealing plug to seal against said outer transom portion, said inner and outer sealing plugs constituting means to establish a substantially air tight chamber within said inner and outer transom portions and said bellows, and means to pressurize said bellows in order to detect leakage thereof.

2. A device as defined in claim 1 further comprising, means for securing said outer sealing plug against said outer transom portion and means for urging said outer sealing plug against said inner sealing plug so that said inner sealing plug seals against said inner housing portion.

3. A device as defined in claim 2 wherein said means for urging includes a spring located between said inner sealing plug and said outer sealing plug.

4. A device as defined in claim 3 wherein said means for securing said outer sealing plug against said outer transom portion includes a pressure bar anchored against said outer transom portion.

5. A device as defined in claim 1 wherein said means to pressurize said bellows includes an air inlet passage in said outer sealing plug for receiving an air line.

* * * * *